(12) United States Patent
Hunt (10) Patent No.: US 10,565,714 B2
(45) Date of Patent: Feb. 18, 2020

(54) FEATURE TRACKING FOR VISUAL ODOMETRY

(71) Applicant: DENSO CORPORATION, Kariya, Aichi-pref. (JP)

(72) Inventor: Shawn Hunt, Pinckney, MI (US)

(73) Assignee: DENSO CORPORATION, Kariya, Aichi-pref. (JP)

( * ) Notice: Subject to any disclaimer, the term of this patent is extended or adjusted under 35 U.S.C. 154(b) by 92 days.

(21) Appl. No.: 15/989,903

(22) Filed: May 25, 2018

(65) Prior Publication Data

US 2019/0362504 A1 Nov. 28, 2019

(51) Int. Cl.
| | | |
|---|---|---|
| G06K 9/00 | (2006.01) | |
| G06T 7/246 | (2017.01) | |
| G08G 1/04 | (2006.01) | |
| G06T 3/00 | (2006.01) | |
| G06K 9/32 | (2006.01) | |

(52) U.S. Cl.
CPC .......... *G06T 7/248* (2017.01); *G06K 9/00362* (2013.01); *G06K 9/00791* (2013.01); *G06K 9/00798* (2013.01); *G06T 3/0068* (2013.01); *G08G 1/04* (2013.01); *G06T 2207/30241* (2013.01); *G06T 2207/30252* (2013.01)

(58) Field of Classification Search
None
See application file for complete search history.

(56) References Cited

U.S. PATENT DOCUMENTS

| | | |
|---|---|---|
| 6,480,615 B1 | 11/2002 | Sun et al. |
| 8,213,706 B2 | 7/2012 | Krishnaswamy et al. |
| 8,428,305 B2 * | 4/2013 | Zhang .................. B60W 30/00 382/103 |
| 8,977,007 B1 * | 3/2015 | Ferguson ........... G06K 9/00825 340/988 |
| 9,558,424 B2 | 1/2017 | Ramalingam et al. |
| 2003/0152271 A1 | 8/2003 | Tsujino et al. |
| 2005/0031166 A1 | 2/2005 | Fujimura et al. |
| 2005/0213818 A1 | 9/2005 | Suzuki et al. |
| 2006/0182348 A1 | 8/2006 | Kinjo |

(Continued)

FOREIGN PATENT DOCUMENTS

| | | |
|---|---|---|
| WO | WO-2010115580 A1 | 10/2010 |
| WO | WO-2017116570 A1 | 7/2017 |

OTHER PUBLICATIONS

"A Robust Visual Odometry and Precipice Detection Sysetm Using Consumer-grade Monocular Vision," by Jason Campbell, Rahul Sukthankar, Illah Nourbakhsh, and Aroon Pahwa, published in Robotics and Automation, 2005 (ICRA 2005) and presented at 2005 IEEE International Conference.

*Primary Examiner* — Dov Popovici
(74) *Attorney, Agent, or Firm* — Harness, Dickey & Pierce, P.L.C.

(57) ABSTRACT

Monocular visual odometry methods and systems for tracking movement of a vehicle relative to a feature in an environment about the vehicle with a single camera of the vehicle. The system includes a camera module, a feature comparison module, and a vehicle tracking module. The vehicle tracking module determines movement of the vehicle from a first position at a first time to a second position at a second time based on movement of the camera from the first position at the first time to the second position at the second time.

20 Claims, 4 Drawing Sheets

(56) References Cited

U.S. PATENT DOCUMENTS

| | | | |
|---|---|---|---|
| 2007/0124030 A1* | 5/2007 | Mori | G06K 9/00791 |
| | | | 701/1 |
| 2007/0265741 A1 | 11/2007 | Ol et al. | |
| 2008/0187175 A1 | 8/2008 | Kim et al. | |
| 2008/0273799 A1 | 11/2008 | Kimura | |
| 2009/0125223 A1 | 5/2009 | Higgins | |
| 2009/0154769 A1 | 6/2009 | Yoon et al. | |
| 2010/0027844 A1 | 2/2010 | Akita | |
| 2010/0080415 A1 | 4/2010 | Qureshi et al. | |
| 2011/0169923 A1 | 7/2011 | Dellaert et al. | |
| 2012/0106828 A1 | 5/2012 | Yoon et al. | |
| 2012/0121131 A1 | 5/2012 | Kim | |
| 2012/0121161 A1 | 5/2012 | Eade et al. | |
| 2014/0300732 A1 | 10/2014 | Friend et al. | |
| 2016/0110878 A1 | 4/2016 | Chang et al. | |
| 2016/0189381 A1 | 6/2016 | Rhoads | |
| 2016/0253820 A1 | 9/2016 | Jeanne et al. | |
| 2016/0335507 A1 | 11/2016 | Chen et al. | |
| 2017/0008521 A1 | 1/2017 | Braunstein et al. | |
| 2017/0277197 A1 | 9/2017 | Liao et al. | |
| 2018/0262739 A1* | 9/2018 | Hunt | G06K 9/00791 |

* cited by examiner

FEATURE TRACKING FOR VISUAL ODOMETRY

FIELD

The present disclosure relates to monocular visual odometry for tracking movement of a vehicle relative to a feature in an environment about the vehicle.

BACKGROUND

This section provides background information related to the present disclosure, which is not necessarily prior art.

Localization is the process of using sensors and algorithms to locate where an automated vehicle is in relation to a preexisting map of the environment. While current localization processes are suitable for their intended use, they are subject to improvement. For example, while the Moravec corner detection algorithm, which takes the sum of squared differences (SSD) between corresponding pixels of two patches, is suitable for its intended use, it may experience reduced accuracy due to camera rotation. The present disclosure advantageously provides for monocular visual odometry methods and systems for tracking movement of a vehicle relative to a feature in an environment about the vehicle with a single camera of the vehicle, as explained in detail herein.

SUMMARY

This section provides a general summary of the disclosure, and is not a comprehensive disclosure of its full scope or all of its features.

The present disclosure includes monocular visual odometry methods and systems for tracking movement of a vehicle relative to a feature in an environment about the vehicle with a single camera of the vehicle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
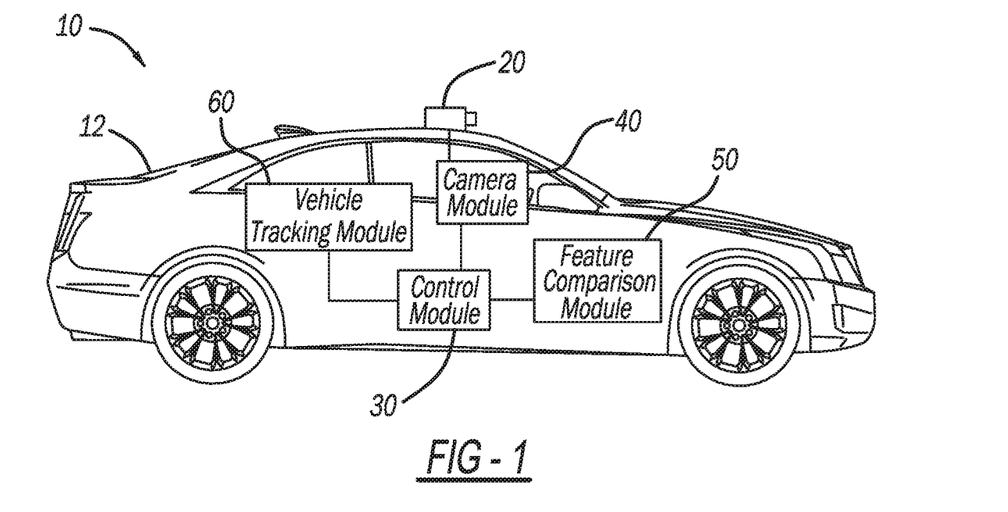
FIG. 1 illustrates a monocular visual odometry system in accordance with the present disclosure for tracking movement of a vehicle relative to a feature in an environment about the vehicle with a single camera of the vehicle.

FIG. 1 illustrates features of an exemplary monocular visual odometry system in accordance with the present disclosure at reference numeral 10. The system 10 is illustrated as installed in an exemplary vehicle 12. Although the vehicle 12 is illustrated as a passenger vehicle, the system 10 may be used with any other suitable vehicle as well, such as any suitable commercial vehicle, mass transit vehicle, military vehicle/equipment, construction vehicle/equipment, watercraft, aircraft, recreational vehicle, etc.

The vehicle 12 includes a camera 20 mounted at any suitable position of the vehicle 12 to capture images of the environment about the vehicle 12. The camera 20 can be any suitable camera, such as any suitable visual light camera or a camera configured to capture any suitable portions of the electromagnetic spectrum. The camera 20 is fixedly mounted to the vehicle 12 to prevent or restrict independent movement of the camera 20 relative to the rest of the vehicle 12. The camera 20 is a single camera, and thus the system 10 and method 110 in accordance with the present disclosure eliminates any need for multiple cameras, which advantageously reduces the complexity of the system 10 and method 110, and reduces overall costs.

The system 10 further includes a control module 30. The control module 30 is any suitable control module for controlling the following additional features of the system 10: camera module 40; feature comparison module 50; and vehicle tracking module 60. In this application, including the definitions below, the term "module" may be replaced with the term "circuit." The term "module" may refer to, be part of, or include processor hardware (shared, dedicated, or group) that executes code and memory hardware (shared, dedicated, or group) that stores code executed by the processor hardware. The code is configured to provide the features of the modules, controllers, and systems described herein. The term memory hardware is a subset of the term computer-readable medium. The term computer-readable medium, as used herein, does not encompass transitory electrical or electromagnetic signals propagating through a medium (such as on a carrier wave). The term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The camera module 40 controls the camera 20 to capture images of the environment about the vehicle 12. The feature comparison module 50 compares the positions of a particular feature in the environment captured in images taken by the camera 20 at different points in time, as described further herein. The feature can be any suitable feature in the environment, such as a corner. As one skilled in the art will appreciate, corner detection is an approach used within computer vision systems to extract certain kinds of features and infer the contents of an image. A corner can be defined as the intersection of two edges. A corner can also be defined as a point for which there are two dominant and different edge directions in a local neighborhood of the point. The feature can be an interest point in an image that has a well-defined position and can be robustly detected. Thus an interest point can be a corner, but it can also be, for example, an isolated point of local intensity maximum or minimum, line endings, or a point on a curve where the curvature is locally maximal. The feature comparison module 50 compares positions of first image pixels of the feature within a first comparison area of a first image taken at a first point in time, with positions of second image pixels of the feature within a comparison area of a second image taken at a second, later point in time to identify movement of the camera from the first position at the first time to the second position at the second time. The comparison is performed by the feature comparison module 50 in any suitable manner, such as by taking the sum of squared differences between the first image pixels and the second image pixels.

Based on movement of the camera detected by the feature comparison module 50, the vehicle tracking module 60 determines movement of the vehicle relative to the feature in the environment. The vehicle tracking module 60 identifies the position of the vehicle 12 within the environment based on the determined movement of the vehicle 12 from a first position at the first time to a second position at the second time.

Figure 2:
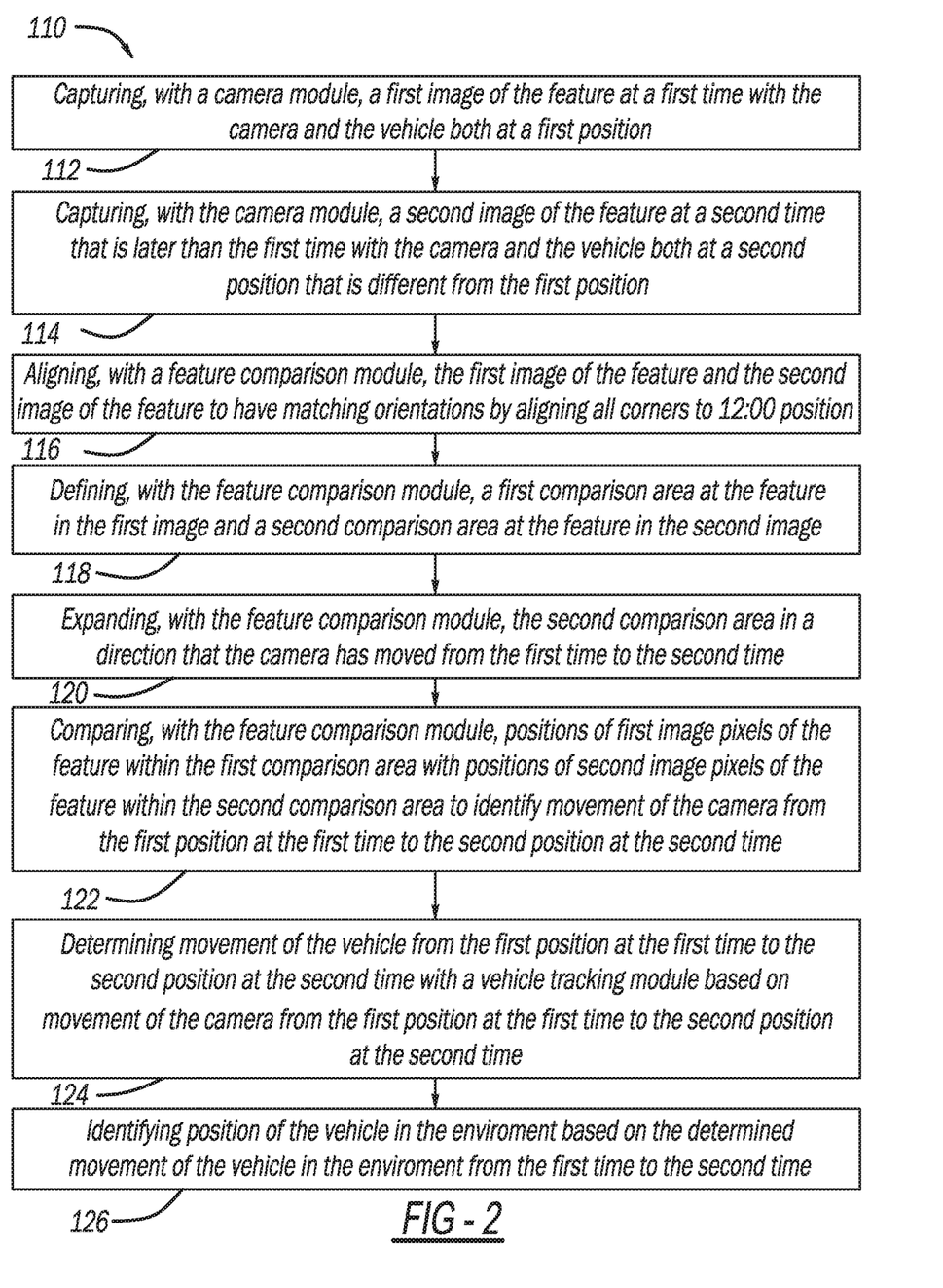
FIG. 2 illustrates a monocular visual odometry method in accordance with the present disclosure.

With additional reference to FIGS. 2-6, the monocular visual odometry system 10 will now be described in additional detail. FIG. 2 illustrates a monocular visual odometry method 110 in accordance with the present disclosure, which may be performed by the system 10 or any other suitable system. With reference to block 112 of the method 110, the camera module 40 captures a first image of the feature at a first time with the camera 20 and the vehicle 12 both at a first position. With reference to block 114, the camera module 40 operates the camera 20 to capture a second image of the feature at a second time that is later than the first time with the camera 20 and the vehicle 12 both at a second position that is different from the first position.

Figure 3:
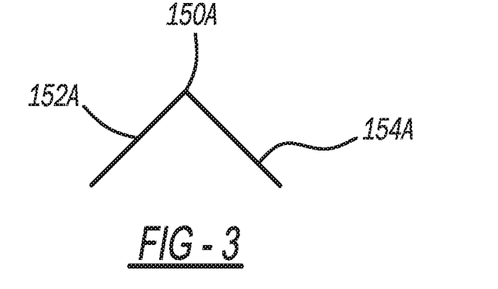
FIG. 3 illustrates an exemplary feature in the environment about the vehicle, which can be used for tracking movement of the vehicle, the image of the feature captured at a first time.
Figure 4A:
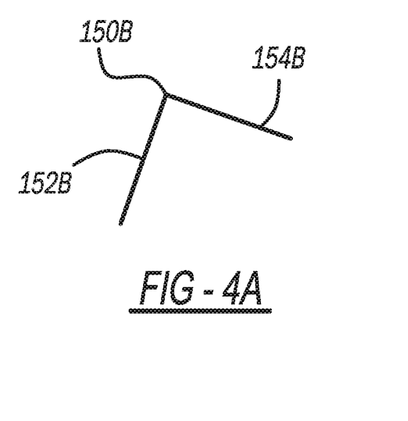
FIG. 4A illustrates the feature of FIG. 3 captured at a second time, with the feature at a different orientation as compared to FIG. 3.
Figure 4B:
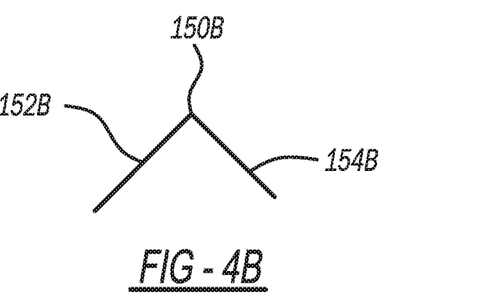
FIG. 4B illustrates the feature captured at the second time after having been rotated from the position of FIG. 4A such that the image of the feature captured at the second time matches the orientation of the image of the feature captured at the first time.

With reference to block 116, the feature comparison module 50 aligns the first image of the feature and the second image of the feature to have matching orientations. More specifically and with reference to FIG. 3, the feature may be a corner and the first image may include a first image of the corner 150A. The corner 150A is at an intersection of lines or edges 152A and 154A. FIG. 4A illustrates a second image of the corner taken at a second time at reference numeral 150B. The corner 150B is at the intersection of lines 152B and 154B. As illustrated in FIGS. 3 and 4A, the corner images 150A and 150B are not aligned with one another, which makes comparison thereof (such as by taking the sum of squared differences between the pixels of the corner images 150A and 150B) difficult and slow. The feature comparison module 50 thus advantageously aligns the first image of the corner 150A and the second image of the corner 150B such that the corners 150A and 150B are both at 12:00. For example, FIG. 4A illustrates the corner 150B prior to rotation by the feature comparison module, and FIG. 4B illustrates the corner 150B after rotation. The orientation of the corner 150B (FIG. 4B) matches the orientation of the corner 150A (FIG. 3) at the 12:00 position.

Figure 5A:
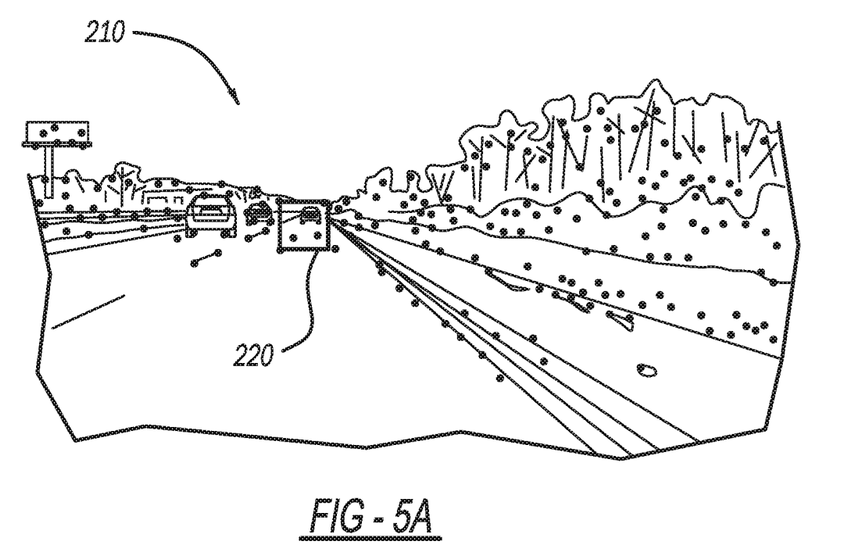
FIG. 5A illustrates a first comparison area of the feature defined in the first image taken at the first time.
Figure 5B:
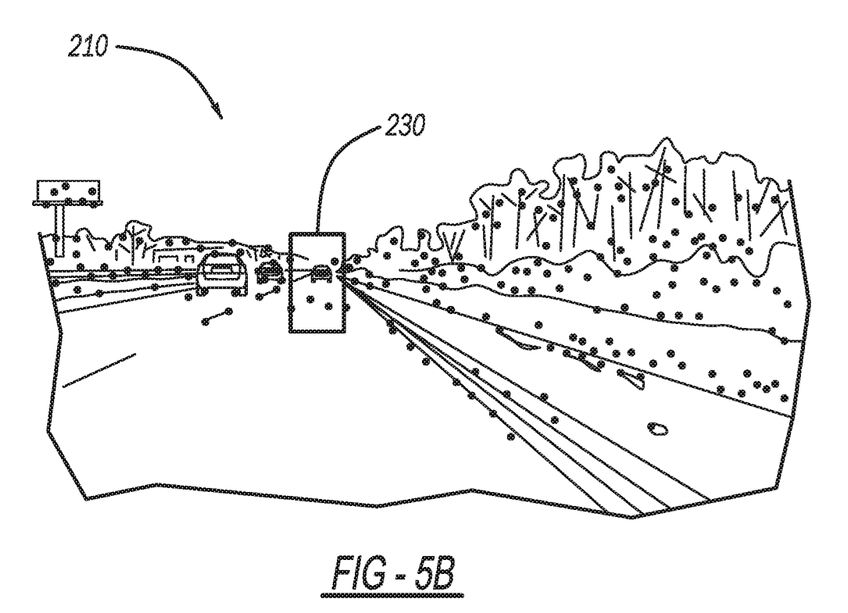
FIG. 5B illustrates a second comparison area defined about the feature in the second image taken at the second time, the second comparison area is similar to the first comparison area, but expanded vertically to take into account camera pitch.

With reference to block 118, the feature comparison module 50 defines a first comparison area at the feature in the first image, and a second comparison area at the feature in the second image. For example and with reference to FIGS. 5A and 5B, FIG. 5A is a first image of an environment 210 about the vehicle 12 taken at a first time, and FIG. 5B is a second image of the environment 210 including the feature taken at a second time. FIG. 5A illustrates the first comparison area at 220. The first comparison 220 can have any suitable shape, such as a square as illustrated at FIG. 5A.

Figure 5C:
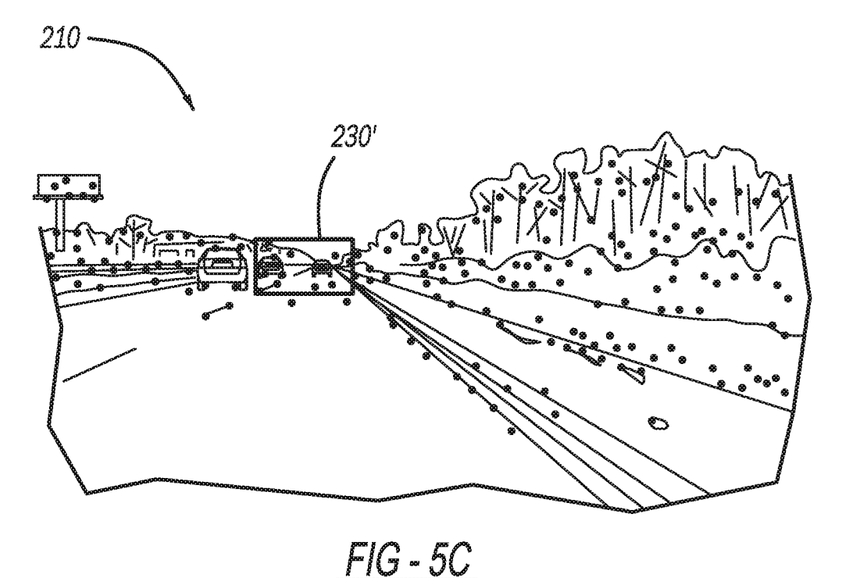
FIG. 5C illustrates a second comparison area defined about the feature in the second image taken at the second time, the second comparison area is similar to the first comparison area, but expanded horizontally to take into account camera roll.

FIG. 5B illustrates the second comparison area at 230. If the camera 20 has moved enough such that in the second image taken at the second time of FIG. 5B the feature is not within the size and shape used to define the first comparison area 220, the feature comparison module 50 advantageously expands the second comparison area 230 to account for movement of the camera 20, as set forth at block 120. In the example of FIG. 5B, the feature comparison module 50 expands the second comparison area 230 vertically into a vertically extending rectangle to take into account camera pitch. For example and as illustrated in FIG. 5C, the feature comparison module 50 can expand the second comparison area 230' horizontally to take into account camera roll.

With reference to block 122, the feature comparison module 50 compares positions of first image pixels of the feature within the first comparison area 220 with positions of second image pixels of the feature within the second comparison area 230/230' to identify movement of the camera 20 from the first position at the first time to the second position at the second time.

Figure 6A:
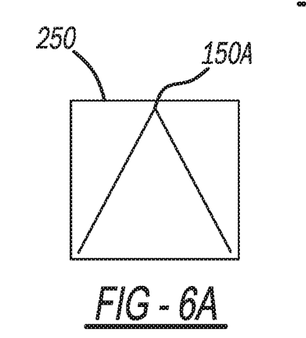
FIG. 6A illustrates a square pixel window of a first image of a corner captured at a first time.
Figure 6B:
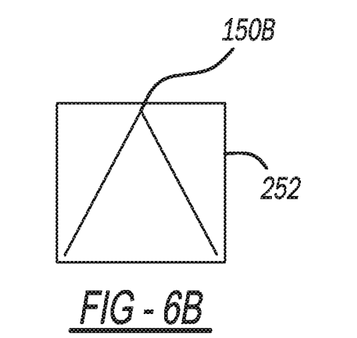
FIG. 6B illustrates a square pixel window of a second image of the corner of FIG. 6A captured at a second time.

With reference to FIGS. 6A and 6B, for example, the feature may be a corner. FIG. 6A illustrates first image pixels of the corner 150A within a 30×30 pixel window 250 from first comparison area 220. FIG. 6B illustrates second image pixels of the corner 150B within a 30×30 pixel window 252 from the second comparison area 230/230'. The feature comparison module 50 compares positions of the first image pixels of the corner 150A from pixel window 250 with positions of the second image pixels of the corner 150B from the pixel window 252 to identify movement of the camera 20.

Figure 7A:
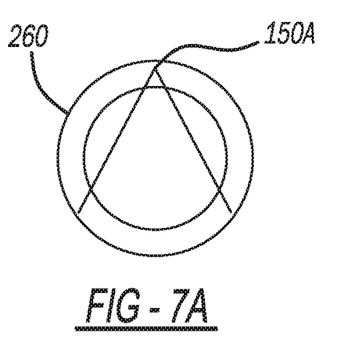
FIG. 7A illustrates an annular pixel window of a first image of a corner captured at a first time.
Figure 7B:
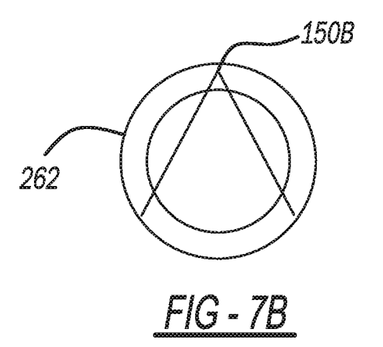
FIG. 7B illustrates an annular pixel window of a second image of the corner of FIG. 7A captured at a second time.

With reference to FIGS. 7A and 7B, annular pixel windows 260 and 262 may be used instead of the 30×30 pixel windows 250/252. When the annular pixel windows 260 and 262 are used, the feature comparison module 50 compares the pixels of the corner 150A between the two rings of the annulus 260 with the pixels of the corner 150B between the two rings of the annulus 262. There are fewer pixels between the two rings of the annular pixel windows 260 and 262 as compared to the square 30×30 pixel windows 250 and 252. Thus use of the annular pixel windows 260 and 262 for the comparison reduces the amount of processing power required by the feature comparison module 50, and advantageously reduces power requirements and processing time.

With reference to block 124, the vehicle tracking module 60 determines movement of the vehicle 12 within the environment 210 from the first position at the first time to the second position at the second time based on movement of the camera 20 from the first position at the first time to the second position at the second time. With reference to block 126, the vehicle tracking module 60 identifies the position of the vehicle 12 in the environment 210 based on the determined movement of the vehicle 12 from the first position at the first time to the second position at the second time. The vehicle tracking module 60, based on the determined positions of the vehicle 12 within the environment 210, can advantageously determine the trajectory of the vehicle 12 within the environment 210, including tracking rotation and translation of the vehicle 12.

The present disclosure thus advantageously provides for systems 10 and methods 110 for determining a trajectory of the vehicle 12 using only a single camera 20. Using only a single camera 20 eliminates any need for multiple cameras, which reduces overall complexity of operation and installation, and reduces costs. One skilled in the art will recognize that the present disclosure provides for numerous additional advantages and unexpected results as well.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A monocular visual odometry method for tracking movement of a vehicle relative to a feature in an environment about the vehicle with a single camera of the vehicle, the method comprising:

capturing, with a camera module and the camera, a first image of the feature at a first time with the camera and the vehicle both at a first position;

capturing, with the camera module and the camera, a second image of the feature at a second time that is later than the first time with the camera and the vehicle both at a second position that is different from the first position;

aligning, with a feature comparison module, the first image of the feature and the second image of the feature to have matching orientations;

defining, with the feature comparison module, a first comparison area at the feature in the first image and a second comparison area at the feature in the second image;

comparing, with the feature comparison module, positions of first image pixels of the feature within the first comparison area with positions of second image pixels of the feature within the second comparison area to identify movement of the camera from the first position at the first time to the second position at the second time;

expanding, with the feature comparison module, the second comparison area in a direction that the camera has moved from the first time to the second time;

determining movement of the vehicle from the first position at the first time to the second position at the second time with a vehicle tracking module based on movement of the camera from the first position at the first time to the second position at the second time; and locating the vehicle in the environment with the vehicle tracking module based on the determined movement of the vehicle from the first position at the first time to the second position at the second time.

2. The method of claim 1, wherein the feature is a corner.

3. The method of claim 2, wherein the corner is an intersection of edges.

4. The method of claim 3, wherein the aligning with the feature comparison module includes aligning a first image of the corner with a second image of the corner.

5. The method of claim 1, wherein determining movement of the vehicle includes tracking trajectory of the vehicle.

6. The method of claim 1, wherein determining movement of the vehicle includes tracking rotation and translation of the vehicle.

7. The method of claim 1, wherein the camera is rigidly mounted to the vehicle to prevent the camera from moving independently of the vehicle.

8. The method of claim 1, wherein the first image and the second image are included with a plurality of images of the feature, the plurality of images taken over an extended time period including the first time and the second time.

9. The method of claim 1, wherein the comparing with the feature comparison module includes taking a sum of squared difference between the first image pixels and the second image pixels.

10. The method of claim 1, wherein the first comparison area is a first annulus and the second comparison area is a second annulus.

11. The method of claim 1, wherein the first comparison area is a square.

12. The method of claim 11, wherein the second comparison area is the square expanded to a vertically extending rectangle by the feature comparison module in response to pitch movement of the camera from the first time to the second time.

13. The method of claim 11, wherein the second comparison area is the square expanded to a horizontally extending rectangle by the feature comparison module in response to roll movement of the camera from the first time to the second time.

14. A monocular visual odometry system for tracking movement of a vehicle relative to a feature in an environment about the vehicle with a single camera of the vehicle, the system comprising:

a camera module that controls the camera to capture a first image of the feature at a first time with the camera and the vehicle both at a first position, and controls the camera to capture a second image of the feature at a second time that is later than the first time with the camera and the vehicle both in a second position that is different from the first position;

a feature comparison module that aligns the first image of the feature and the second image of the feature to have matching orientations;

the feature comparison module defines a first comparison area at the feature in the first image and a second comparison area at the feature in the second image;

the feature comparison module compares positions of first image pixels of the feature within the first comparison area with positions of second image pixels of the feature within the second comparison area to identify movement of the camera from the first position at the first time to the second position at the second time;

the feature comparison module expands the second comparison area in a direction that the camera has moved from the first time to the second time;

a vehicle tracking module determines movement of the vehicle from the first position at the first time to the second position at the second time based on movement of the camera from the first position at the first time to the second position at the second time; and the vehicle tracking module locates the vehicle's position in the environment based on the determined movement of the vehicle from the first position at the first time to the second position at the second time.

15. The system of claim 14, wherein the feature is a corner.

16. The system of claim 15, wherein the corner is an intersection of two edges.

17. The system of claim 16, wherein determining movement of the vehicle includes tracking rotation and translation of the vehicle.

18. The system of claim 14, wherein the camera is rigidly mounted to the vehicle to prevent the camera from moving independently of the vehicle.

19. The system of claim 14, wherein:

the first comparison area is a square;

the second comparison area is the square expanded to a vertically extending rectangle by the feature comparison module in response to pitch movement of the camera from the first time to the second time; and the second comparison area is the square expanded to a horizontally extending rectangle by the feature comparison module in response to roll movement of the camera from the first time to the second time.

20. The system of claim 14, wherein the first comparison area is a first annulus and the second comparison area is a second annulus.

* * * * *

UNITED STATES PATENT AND TRADEMARK OFFICE
CERTIFICATE OF CORRECTION

| | |
|---|---|
| PATENT NO. | : 10,565,714 B2 |
| APPLICATION NO. | : 15/989903 |
| DATED | : February 18, 2020 |
| INVENTOR(S) | : Shawn Hunt |

Page 1 of 1

It is certified that error appears in the above-identified patent and that said Letters Patent is hereby corrected as shown below:

On the Title Page

Column 2, item (56), Other Publications, Line 1, Delete "Sysetm" and insert --System-- therefor.

Signed and Sealed this
Twenty-eighth Day of July, 2020

Andrei Iancu
*Director of the United States Patent and Trademark Office*